United States Patent [19]
O'Connor

[11] 3,829,158
[45] Aug. 13, 1974

[54] VEHICLE SEAT HARNESS
[76] Inventor: Robert O'Connor, 777 E. 48th St., Brooklyn, N.Y. 11225
[22] Filed: Aug. 31, 1972
[21] Appl. No.: 285,132

[52] U.S. Cl. ............................................. 297/390
[51] Int. Cl. ........................................... A62b 35/60
[58] Field of Search ........... 297/388–394, 384, 417, 297/418, 216; 280/150 SB, 150 B

[56] References Cited
UNITED STATES PATENTS

| | | | |
|---|---|---|---|
| 1,253,241 | 1/1918 | Haussinger | 297/390 X |
| 2,325,141 | 7/1943 | Lloyd | 297/390 |
| 2,661,221 | 12/1953 | Lockwood et al. | 280/150 B |
| 2,690,790 | 10/1954 | Linden | 297/390 X |
| 2,818,624 | 1/1958 | Fauteux | 248/301 |
| 2,861,626 | 11/1958 | Mills | 297/390 |
| 2,876,829 | 3/1959 | Johnson | 297/389 |
| 3,146,026 | 8/1964 | Berlin | 297/390 |
| 3,181,827 | 5/1965 | Sassin | 248/301 X |
| 3,620,569 | 11/1971 | Mathis | 297/389 |
| 3,640,572 | 8/1972 | Doehler | 280/150 B |
| 3,713,694 | 1/1973 | Miller | 297/390 |
| 3,722,951 | 3/1973 | Ezquerra | 297/390 |

FOREIGN PATENTS OR APPLICATIONS

| | | | |
|---|---|---|---|
| 5,566 | 3/1901 | Great Britain | 297/300 |
| 1,008,155 | 5/1952 | France | 297/390 |

Primary Examiner—Paul R. Gilliam
Assistant Examiner—G. O. Finch
Attorney, Agent, or Firm—Kenyon & Kenyon Reilly Carr & Chapin

[57] ABSTRACT

The seat harness is constructed to extend over the rear of a vehicle seat while rising slightly above the seat and shoulder of the occupant and then downwardly to the waistline of the occupant. The harness includes a pair of hook-shaped members which are spaced from the occupant to restrain excessive forward motion of the occupant. The hook-shaped members are spring biased to bias the harness onto the vehicle seat when the occupant is not seated and thus insure that the harness is used when the seat is occupied.

6 Claims, 8 Drawing Figures

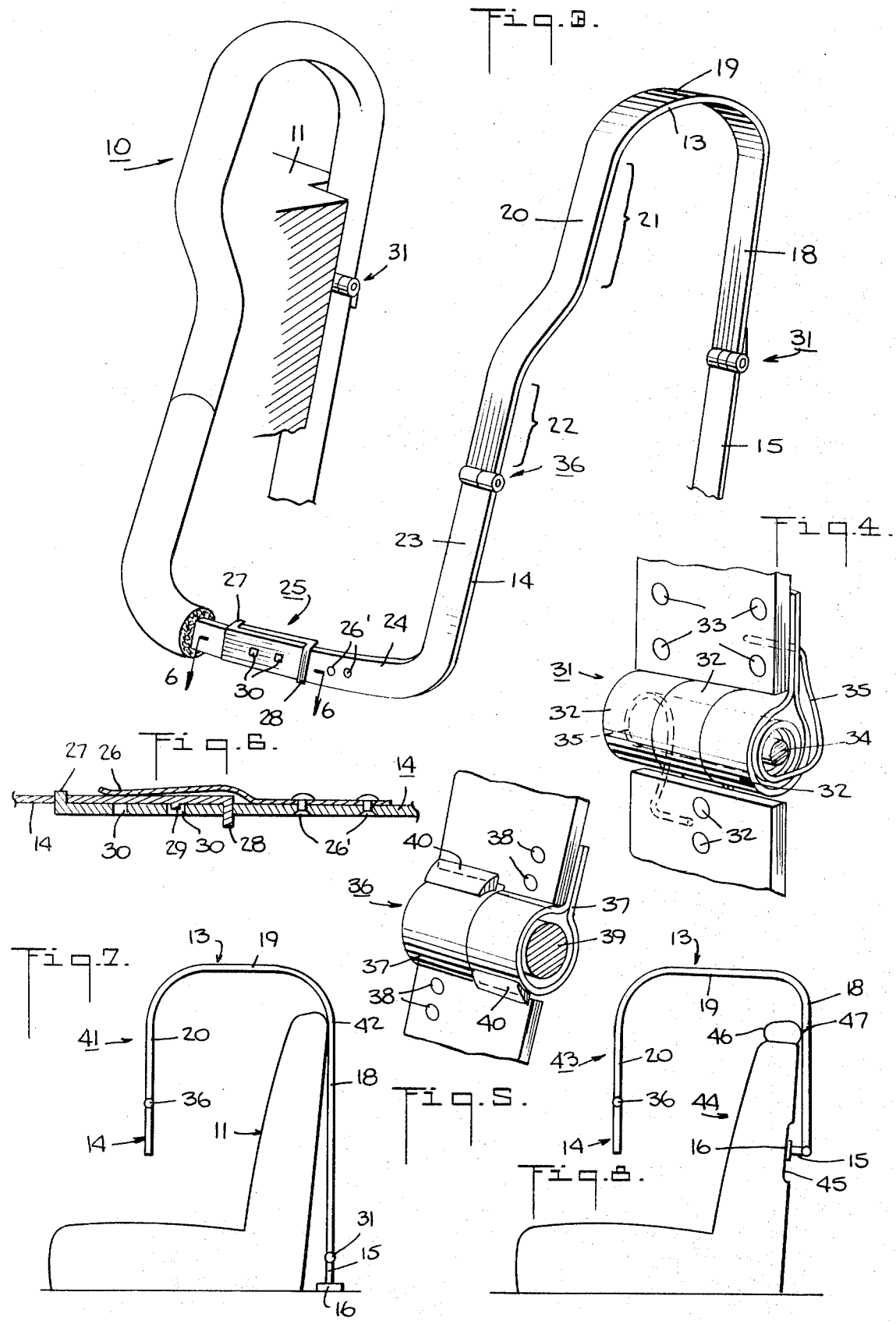

VEHICLE SEAT HARNESS

This invention relates to a vehicle seat harness.

Heretofore, many types of restraints have been used or suggested for use in vehicles, especially automobiles. One familiar type of restraint is a flexible seat belt which is used to encircle a person's waist when the person is seated. These seat belts have also been used with a shoulder belt which is usually secured to the roof of a vehicle and passes cross-wise over an occupant. However, in many cases, the seat belts have not been used for a variety of reasons. Thus, in order to insure use of the seat belts, vehicles have been equipped with warning signals or buzzers which are activated should a seat belt not be properly utilized when the engine of a vehicle is started. In some cases, the engines are locked against starting until the seat belts are put to use. This has, however, required added equipment and expense. Furthermore, in some instances where the belts are made of materials subject to wear, the belts can become weakened and worn to such a point as to require replacement, and usually in pairs. This also contributes to the overall cost of using this type of restraint. Also, in the case of a shoulder belt, such can be placed in a position during use across a person's neck that, upon occurrance of an accident and propelling of a person forwardly, the shoulder belt might choke or possibly break the clavical bone of a person.

Other restraints which have been suggested include the use of rigid bars which are to be pivotally mounted on a seat so as to be positioned across an occupant's waist when in use. However, such restraints have generally been cumbersome and expensive to construct and install in a vehicle. Also, air bags have been suggested which inflate upon impact of a vehicle against another object to prevent a pitching forward of the vehicle occupant. These air bags have, however, not been perfected for commercial use. Also, these air bags would appear to be expensive to use from the standpoint of installation and maintenance.

In the case of the restraints which have been only placed around the waistline, such have not been totally effective in preventing a pitching forward in a jackknife type manner of the occupant of a vehicle during impact. As a result, injuries may still occur to the upper part of the occupant's person.

Accordingly, it is an object of the invention to provide a vehicle seat restraint to limit forward movement of a vehicle seat occupant.

It is another object of the invention to provide a seat harness of relatively simple construction.

It is another object of the invention to provide a seat harness capable of a relatively long life.

It is another object of the invention to provide a seat harness for enveloping the shoulders of a vehicle seat occupant.

Briefly, the invention provides a seat harness for a vehicle seat which includes a pair of self-supporting hook-shaped members which project over a vehicle seat to envelope the upper portions of an occupant of the seat. The harness also comprises a pair of self-supporting upright supports which serve to hingedly secure the harness to the vehicle seat or to the floor of the vehicle. In addition, the harness includes a means between each hook-shaped member and each support means to bias the hook-shaped members in a direction forwardly of the seat. Still further, the vehicle has a pair of self-supporting waist restraining components, each of which is hingedly secured to a hook-shaped member at one end and to each other at the opposite end by a locking means. These components are of L-shape to extend across the waistline of an occupant of the seat while the locking means is adjustable so as to adjust to the contour of the person occupying the vehicle seat.

The various components of the seat harness are made of a durable self-supporting material such as spring steel to insure a long life and to provide a rigid type of restraint. In addition, the hook-shaped members and the waist restraining components can be covered with a suitable padding to provide a cushioned surface.

The harness is disposed so that the hook-shaped members and waist restraining components must be moved out of the way before an occupant can be properly seated. To this end, the hook-shaped members are biased by spring loaded hinges at the points of securement to the supports to overlie the seat of the vehicle. The hook-shaped members are each dimensioned with a short vertical portion which extends above the seat, a horizontal portion which extends forwardly of the seat and a depending vertical portion which extends down to a point approximately midway of the seat backrest. The waist restraining components each have a vertical portion which extends from a hook-shaped member down to the base of the seat.

In use, the harness is raised by pivoting on the supports to permit entry of an occupant. At the same time, the waist restraining components pivot relative to the hook-shaped members to facilitate entry. To this end, hinges are used which are of a type to prevent outward movement of the waist restraining components relative to the hook-shaped members. When the occupant is properly seated, the harness is lowered into position.

When in position, the hook-shaped members are spaced slightly forwardly of the shoulders and chest of the occupant to permit limited movement of the occupant without interference from the harness while the waist restraining components lie across the waist of the occupant under the spring biasing force of the spring loaded hinges. Should an impact occur which causes the occupant to pitch forwardly, contact would be made with the hook-shaped members after a limited forward movement. Thereafter, the hook shaped members would serve to restrain further forward movement of the occupant.

In order to exit from the harness, the waist restraining components are lifted to cause upward pivoting of the harness on the supports until the occupant can clear the harness.

The seat harness provides a substantially rigid restraint which envelops the upper portions of an occupant's person so as to limit forward pitching of the occupant. Further, the various components can be made of suitable materials so as to be adjustably expandable widthwise to widen or narrow the lateral extent of the harness relative to the size of the occupant.

Further, the harness is of an involuntary type so that the occupant of the vehicle must carry out some manipulation of the harness in order to be properly seated in the vehicle.

The seat harness is made of relative simple components such that manufacture can be carried out in a relatively simple low cost economical manner.

These and other objects and advantages of the invention will become more apparent from the following detailed description and appended claims taken in conjunction with the accompanying drawings in which:

FIG. 3 illustrates a part cross-sectional perspective view of the seat harness;

FIG. 4 illustrates a view of a spring loaded hinge securing a hook-shaped member to a support in accordance with the invention;

FIG. 5 illustrates a view of a limit hinge for securing a waist restraining component to a hook-shaped member in accordance with the invention;

FIG. 6 illustrates a view taken on line 6—6 of FIG. 3;

FIG. 7 illustrates a side view of a seat harness secured to the frame of a vehicle seat according to the invention; and FIG. 8 illustrates a view of a seat harness secured in a modified manner to a vehicle seat according to the invention.

Figure 2:
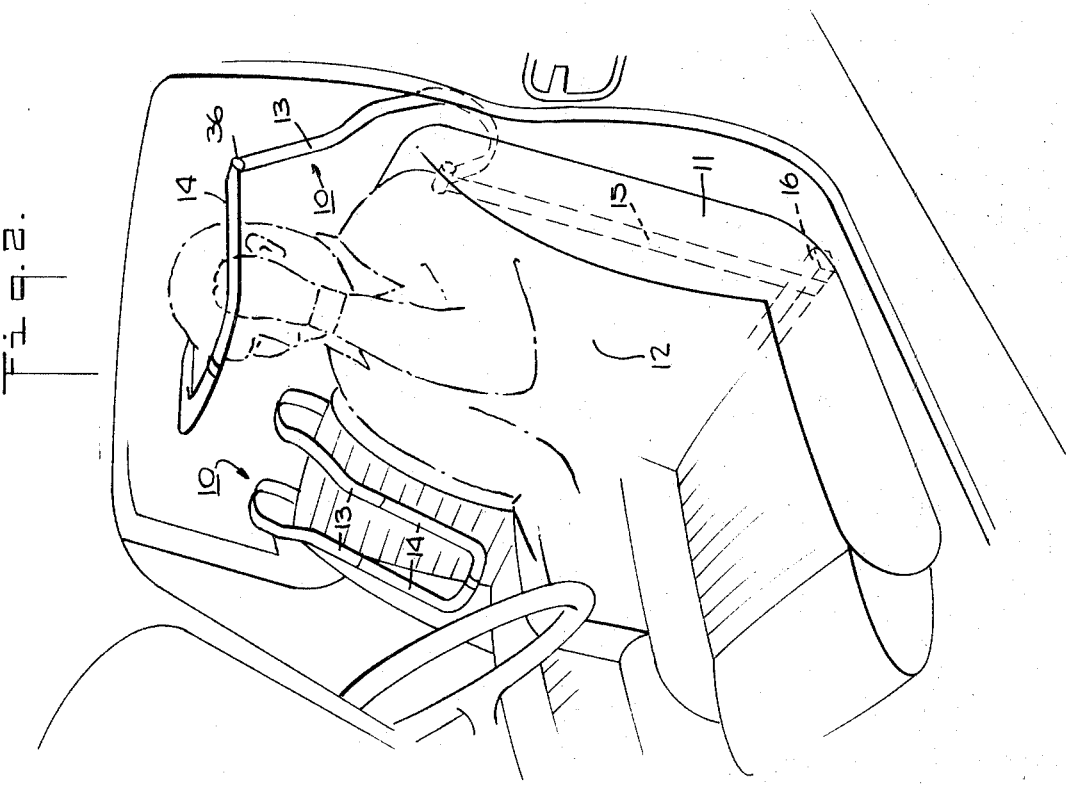
FIG. 2 illustrates a perspective view of the seat harness in a raised position to permit exit.
Figure 1:
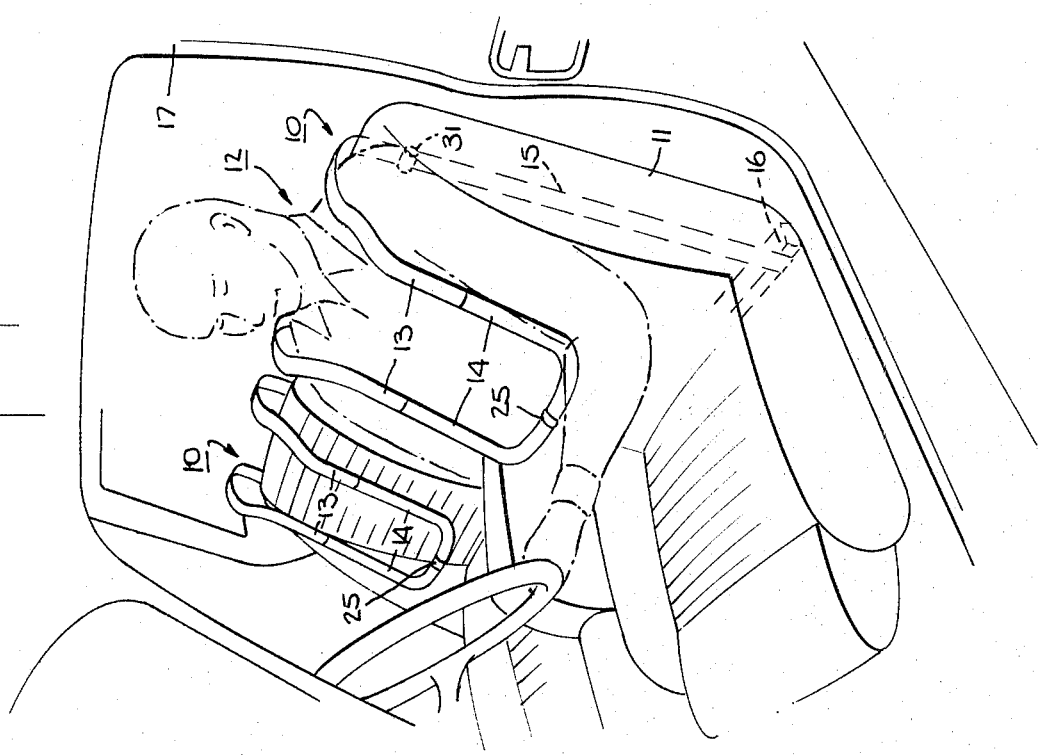
FIG. 1 illustrates a perspective view of a seat harness in place in a vehicle according to the invention.

Referring to FIGS. 1 and 2, the seat harness 10 consists of a series of parts such as spring steel bars which are shaped and connected together to overlie a vehicle seat 11 to envelope the upper portion of an occupant 12 of the seat 11. The harness 10 includes a pair of hook-shaped members 13 and a pair of L-shaped waist restraining members 14 and is mounted on a pair of upright supports 15 secured to a steel bar 16 fixed to the frame of a vehicle 17.

Referring to FIGS. 1 and 3, each hook-shaped member 13 includes a vertical portion 18 which extends upwardly from a support 15 over the back of the vehicle seat 11 to a point above the shoulders of an occupant 12 (FIG. 1). In addition, each hook-shaped member 13 includes a generally horizontal portion 19 of flat or arcuate contour which extends forwardly of the vehicle seat 11 to project past the occupant 12. Also, each hook-shaped member 13 includes a depending vertical portion 20 which extends down to a point about midway of the vehicle seat 11. This depending vertical portion 20, as viewed from the front, has an upper portion 21 which passes about the shoulder and neck of the occupant 11 and an inwardly offset lower portion 22 which passes by the chest of the occupant 11. The offset is, for example, 1 inch between the two portions 21, 22.

Each waist restraining component 14 includes a vertical portion 23 which extends downwardly from a hook-shaped portion 13 and a horizontal portion 24 which extends toward the other waist restraining component 14. The ends of the waist restraining components 14 are secured together by a suitable adjustable locking means 25.

As shown in FIG. 3, the lower portions 22 of the hook-shaped members 13 are in alignment with the vertical portions of the hook-shaped members 14 while the upper portions 29 of the hook-shaped members 13 are disposed laterally outwardly thereof to pass around the neck area of the occupant 12. The offset thus serves to permit the lower portions of the hook-shaped members 13 to lie within the chest area of the occupant while permitting the hook-shaped members to pass by the neck of the occupant 12 with a suitable clearance.

Referring to FIGS. 3 and 6, the adjustable locking means 25 is constituted by overlapping portions of the waist restraining members 14, the ends of which are guided within each other, and a spring 26 secured as by rivets 26' to one of the waist restraining components 14. As shown, the component 14 carrying the spring 26 is provided at the end with a pair of hook-shaped arms 27 which envelope the other component 14 while this other component 14 is provided with an enveloping bridge-like member 28 at the end which encircles the first component 14 with a clearance. In addition, a detent 29 which functions as a catch is integrally formed on one waist restraining component 14 while the other has a number of apertures 30 to selectively receive the detent 29. The bridge-like member 28 functions as a catch release which when pressed moves the ends of the components 14 apart against the biasing force of the spring 26 while moving the detent 29 out of an aperture 30. In this way, the components 14 can be adjusted relative to the size of the occupant 12.

Referring to FIGS. 3 and 4, each hook-shaped member 13 is hingedly secured to a support 15 by a spring biased hinge 31. As shown in FIG. 4, the hinge 31 includes a pair of hinge straps 32 which are secured on the end of a hook shaped member 13 by rivets 33 and a similar hinge strap 32 secured by the support 15 by rivets 33. The respective hinge straps 32 define a space which receives a hinge bar 34 for securement of the straps 32 together in a known manner and a spring 35 so that the hook-shaped member 13 is biased by the spring 35 inwardly of the support 15 as viewed.

Referring to FIGS. 3 and 5, each waist restraining member 14 is hinged to a hook-shaped member 13 by a limit hinge 36. As shown, each limit hinge 36 includes a hinge strap 37 secured as by rivets 38 on each of the components 13, 14 and a hinge bolt 39 which passes through the hinge straps 37 and is secured therein in a suitable fashion. Also, a stop 40 is fixedly secured on each hinge strap 37 to limit pivoting of the waist restraining components 14 relative to the hook-shaped members 13.

Referring to FIG. 3, the various parts 13, 14 of the harness 10 are made of spring steel stock, for example, of 1 by 3/16 inch or any other suitable self-supporting material. Also, the hook-shaped members 13 are provided with padding 41 to provide a cushioned surface. The waist restraining components 14 may also be provided with a cushioning material in areas which would not interfer with proper operation of the lock means 25.

Referring to FIG. 1, when in position about an empty seat 11, the seat harness 10 extends downwardly over the seat 11 with the waist restraining components 14 positioned in a depending manner over the base of the seat 11.

When an occupant 12 is in position on the seat 11, the hook-shaped portions 13 of the harness 10 extend about the shoulders and chest of the occupant 12 in spaced relation to permit some forward movement of the occupant 12. At the same time, the waist restraining components 14 are positioned so that the lower horizontal portions 24 lie across the waist line of the occupant 12.

In order to permit exit of an occupant 12 from the vehicle 17, the harness 10 is raised upwardly as shown in FIG. 2. This causes the harness 10 to pivot on the supports 15 via the spring biased hinges 31. At the same time, the waist restraining components 14 pivot relatively to the hook-shaped members 13 via the limit hinges 36. This latter facilitates passage of the harness 10 over the shoulders and head of the occupant 12 so that the occupant 12 can more readily exit from the vehicle 17. After exit, the harness 10 is released so as to be returned into the at-rest position under the biasing force of the springs 35 of the hinges 31.

Referring to FIG. 7 wherein like reference numerals indicate like parts as above, the harness 41 can be constructed so that the hook-shaped members 13 are of rectilinear shape with flat horizontal portions 19 and straight vertical portions 18, 20. Also, as shown, the supports 15 and the vertical portions 18 of the seat harness 41 are disposed behind the backrest of the seat 11 with the spring biased hinges 31 located close to the floor of the vehicle. Also, the vertical portions 18 rest against the back of the seat 11 at an upper point 42 to prevent contact with an occupant. As shown, the horizontal portions 19 of the harness 41 are of a sufficient length to clear the person of an occupant by about 1 inch.

Referring finally to FIG. 8 wherein like reference characters indicate like parts as above, the harness 43 can also be supported from the vehicle seat 44. To this end, a steel bar 16 is secured to the frame of the seat 44, for example, to a steel bracket 45 for mounting of a head rest 46 in the seat 44. The supports 15 are then secured in horizontal orientation to the bar 16 and the spring biased hinges 31 are constructed to bias the harness 43 forwardly. As in FIG. 7, the vertical portions 18 of the harness 43 rest against an upper point 47 of the rear of the seat 44.

The invention thus provides a seat harness of substantially rigid components which serve as an involuntary type of restraint for the occupants of a moving vehicle. The seat harness permits a restraining force to be applied to an occupant at an upper area of the person of the occupant so as to limit pitching forward.

As the seat harness can be made of relatively inexpensive materials which are durable over a relatively long period of time, the overall cost can also be relatively low.

What is claimed is:

1. A seat harness for a seat comprising
    a support means;
    a pair of rigid hook-shaped members made of self-supporting material for enveloping the chest and shoulders of a seat occupant, each member being hingedly secured to said support means and having a depending vertical portion;
    means connected between each respective hook-shaped member and said support means biasing said member in a direction forwardly of a seat;
    a pair of waist restraining components made of rigid self-supporting material, each component being hingedly secured to a respective one of said hook-shaped members at one end thereof and having a vertical portion extending therefrom and a horizontal portion;
    means connected between each respective hook-shaped member and respective waist restraining component for limiting pivoting of said component outwardly of said member; and
    an adjustable locking means securing said horizontal portions of said waist restraining components to each other.

2. A seat harness as set forth in claim 1 wherein said hook-shaped members and said waist restraining members are of spring steel.

3. A seat harness as set forth in claim 1 which further includes padding means on at least a portion of said hook-shaped members.

4. In combination with a seat in a vehicle having an upstanding backrest portion; a seat harness for restraining motion of a seat occupant forwardly of said backrest,
    said seat harness including
    a support means;
    a pair of hook-shaped members made of rigid self-supporting material, each member being hingedly secured to said support means to overlie said backrest in parallel horizontally spaced apart relation for enveloping the chest and shoulders of an occupant of said seat,
    means connected between each respective hook-shaped member and said support means biasing said member in a direction forwardly of said backrest,
    a pair of waist restraining components, each component being secured to a respective one of said hook-shaped members and having a portion extending horizontally relative to said member, and
    an adjustable locking means securing said waist restraining components to each other.

5. The combination as set forth in claim 4 wherein each waist restraining member is made of rigid self-supporting material and includes a vertical portion depending from a respective hook-shaped member and a flat horizontal portion having an end and wherein said locking means secures each end to the other end.

6. The combination as set forth in claim 4 wherein each waist restraining component is hingedly secured to a respective hook-shaped member and which further includes means connected between each respective hook-shaped member and respective waist restraining component for limiting pivoting of said component outwardly of said member in a direction away from said backrest.

* * * * *

UNITED STATES PATENT OFFICE
CERTIFICATE OF CORRECTION

Patent No. 3,829,158　　　　　　Dated August 13, 1974

Inventor(s)　　　　　ROBERT O'CONNOR

It is certified that error appears in the above-identified patent and that said Letters Patent are hereby corrected as shown below:

Correct the inventor's address to read as follows:

--1777 East 48th Street
Brooklyn, New York 11234--

Signed and sealed this 29th day of October 1974.

(SEAL)
Attest:

McCOY M. GIBSON JR.　　　　　　C. MARSHALL DANN
Attesting Officer　　　　　　　Commissioner of Patents